(12) United States Patent
Heinbokel et al.

(10) Patent No.: US 8,734,118 B2
(45) Date of Patent: May 27, 2014

(54) SET OF PISTON COMPRESSORS AND METHODS FOR OIL COMPENSATION

(75) Inventors: Bernd Heinbokel, Cologne (DE); Heinz Gassen, Sinzig (DE); Kai Munker, Aachen (DE)

(73) Assignee: United Technologies Corporation, Hartford, CT (US)

( * ) Notice: Subject to any disclaimer, the term of this patent is extended or adjusted under 35 U.S.C. 154(b) by 782 days.

(21) Appl. No.: 12/738,235

(22) PCT Filed: Oct. 18, 2007

(86) PCT No.: PCT/EP2007/009044
§ 371 (c)(1),
(2), (4) Date: Apr. 15, 2010

(87) PCT Pub. No.: WO2009/049649
PCT Pub. Date: Apr. 23, 2009

(65) Prior Publication Data
US 2010/0247331 A1   Sep. 30, 2010

(51) Int. Cl.
*F04B 49/00*   (2006.01)

(52) U.S. Cl.
USPC .................................. 417/12; 62/84; 62/157

(58) Field of Classification Search
USPC .............. 417/12, 14, 18, 22, 223; 62/84, 157
See application file for complete search history.

(56) References Cited

U.S. PATENT DOCUMENTS

| | | | |
|---|---|---|---|
| 3,140,041 A | 7/1964 | Kramer | |
| 5,634,345 A * | 6/1997 | Alsenz | 62/84 |
| 5,996,363 A | 12/1999 | Kurachi et al. | |
| 6,871,505 B2 * | 3/2005 | So et al. | 62/157 |
| 2004/0003605 A1 | 1/2004 | So et al. | |
| 2005/0076657 A1 | 4/2005 | Kim | |

* cited by examiner

*Primary Examiner* — Charles Freay
*Assistant Examiner* — Patrick Hamo

(57) ABSTRACT

A set of piston compressors (2, 4, 6, 8) for use in a refrigeration system comprises a fluid connection (10) between the crank cases of the piston compressors (2, 4, 6, 8) for allowing oil compensation between said piston compressors (2, 4, 6, 8); and a control unit (12) which in operation monitors the running time of each piston compressor (2, 4, 6, 8) and, in case all piston compressors (2, 4, 6, 8) are running, subsequently interrupts the operation of a respective piston compressor (2, 4, 6, 8) for a predetermined period of time for oil compensation if its running time reaches a predetermined maximum running time.

17 Claims, 6 Drawing Sheets

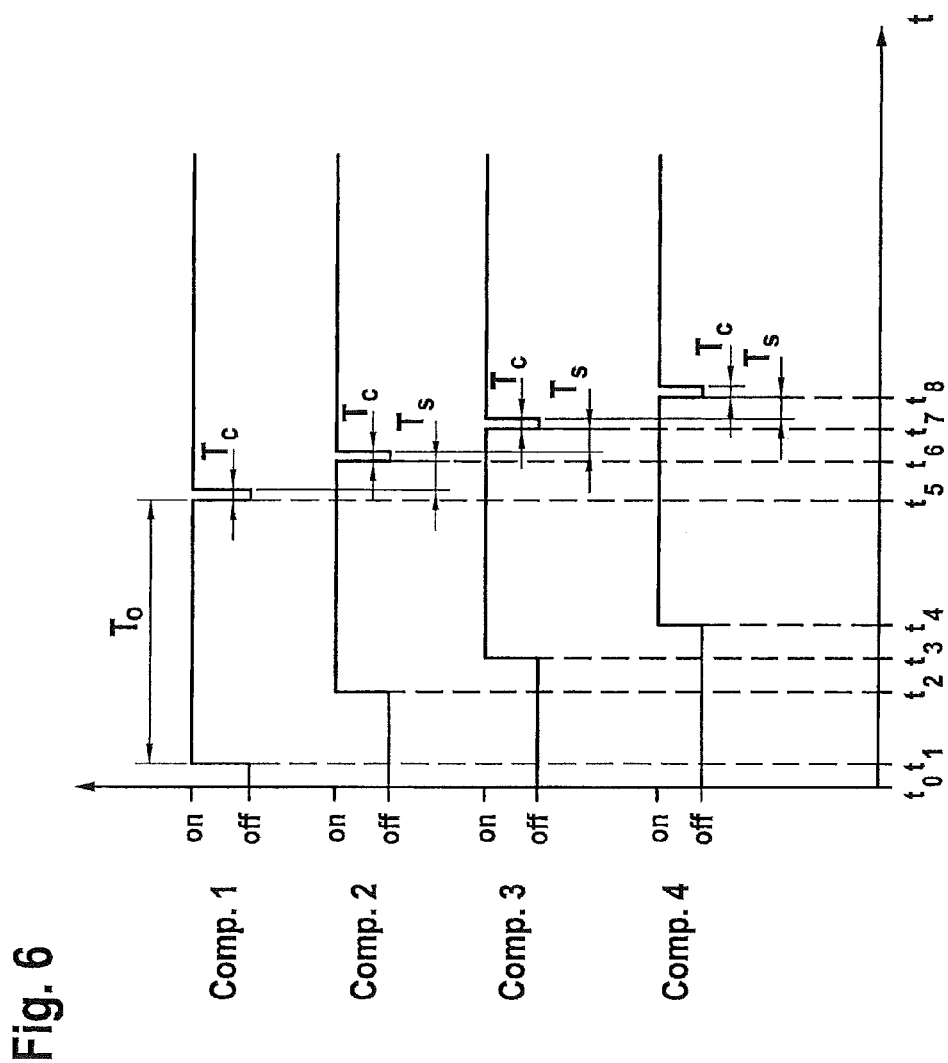

SET OF PISTON COMPRESSORS AND METHODS FOR OIL COMPENSATION

This application is entitled to the benefit of, and incorporates by reference essential subject matter disclosed in PCT Application No. PCT/EP2007/009044 filed on Oct. 18, 2007.

BACKGROUND OF THE INVENTION

1. Technical Field

The invention relates to a set of piston compressors for use in a refrigeration system and to a method for oil compensation in a set of piston compressors.

2. Background Information

Refrigerating circuits often comprise a set of compressors which may be located in a separate machine room. The individual compressors are selectively switched on and off in order to match the actual need for cooling capacity. However, a compressor running continuously for a long period of time may run out of oil needed for lubrication, resulting in damage of the compressor. Thus, conventionally sets of compressors are switched off completely in certain intervals to allow for oil compensation. This results in a discontinuity of the output of the set of compressors over time compromising the performance of the refrigerating circuit.

Accordingly it would be beneficial to provide an improved set of piston compressors which ensures an adequate lubrication and at the same time a constant output.

SUMMARY OF THE INVENTION

Exemplary embodiments of the invention include a set of piston compressors for use in a refrigeration system comprising a fluid connection between the crank cases of the piston compressors for allowing oil compensation between said piston compressors and a control unit which in operation monitors the running time of each piston compressor, and, in case all piston compressors are running, subsequently interrupts the operation of a respective piston compressor for a predetermined period of time for oil compensation if its running time reaches a predetermined maximum running time.

Exemplary embodiments of the invention further include a set of piston compressors comprising a fluid connection between the crank cases of the piston compressors for allowing oil compensation between said piston compressors, and a control unit which, in case all piston compressors are running, monitors the common running time of the piston compressors, and, when the common running time reaches a predetermined maximum common running time, sequentially interrupts the operation of a each piston compressor for a predetermined period of time for oil compensation while the other compressors continue to run.

Exemplary embodiments of the invention further include a method for oil compensation in a set of piston compressors comprising the steps of monitoring the running time of each piston compressor and, in case all piston compressors are running, interrupting the operation of a piston compressor for a predetermined period of time for oil compensation when its running time reaches a predetermined time of operation.

Embodiments of the invention further comprise a method for oil compensation in a set of piston compressors comprising the steps of monitoring the running time of the piston compressors and, in case all piston compressors are running and the running time reaches a predetermined time of operation, interrupting the operation of a first piston compressor for a predetermined period of time for oil compensation; and sequentially interrupting the operation of a each of the additional piston compressors for a predetermined period of time for oil compensation.

Embodiments of the invention will be described in greater detail below with reference to the enclosed Figures, wherein

DESCRIPTION OF THE DRAWINGS

FIG. 6 shows an exemplary diagram depicting the operation of the set of piston compressors shown in FIG. 5 over time.

DETAILED DESCRIPTION OF THE INVENTION

Figure 1:
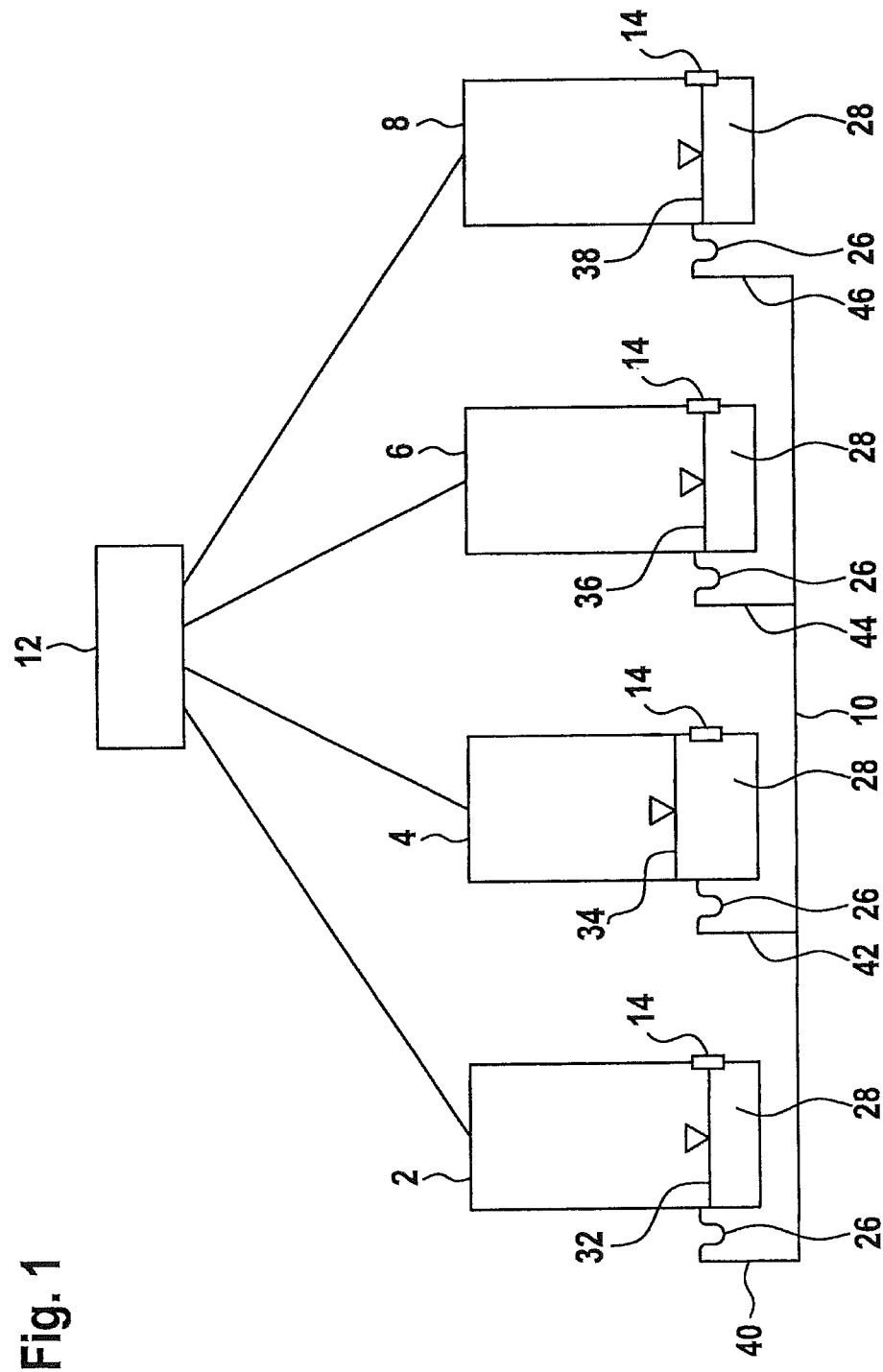
FIG. 1 shows a set of piston compressors according to a first embodiment of the invention.

FIG. 1 shows a set of four piston compressors 2, 4, 6, 8 according to a first embodiment of the invention. The crank cases of said piston compressors 2, 4, 6, 8 are respectively filled up to a certain level 32, 34, 36, 38 with a lubricating oil 28. Each of the piston compressors 2, 4, 6, 8 comprises an inspection glass 14 for inspecting the level 32, 34, 36, 38 of the lubricating oil 28 within the respective crank case. A first end of a respective oil conduit 40, 42, 44, 46 opens into each of the crank cases at approximately the same height at which the inspection glass 14 is positioned. A second end of each of said oil conduits 40, 42, 44, 46 opens into a fluid connection 10 fluidly connecting the crank cases of the piston compressors 2, 4, 6, 8 with each other for allowing oil compensation. The oil conduits 40, 42, 44, 46 can open into the fluid connection 10 from the bottom, from the top or from the side. Thus, when all piston compressors 2, 4, 6, 8 are stopped, the levels 32, 34, 36, 38 of the oil 28 within the crank cases will adjust to approximately the same height within the visible range of each of the inspection glasses 14. Traps/siphon traps 26 are arranged in oil conduits 40, 42, 44, 46 for providing a gas-tight seal in order to prevent gas from flowing from the compressors 2, 4, 6, 8 into the fluid connection 10. The traps/siphons may be arranged close to the compressors 2, 4, 6, 8, close to the manifold 10 or in the manifold 10 itself. A control unit 12 is connected to each of the compressors 2, 4, 6, 8 for controlling their operation.

The number of four compressors 2, 4, 6, 8 as shown in FIG. 1 is only exemplary and any number of compressors 2, 4, 6, 8 which is considered suitable for providing the desired output may be used in a set of compressors 2, 4, 6, 8 according to embodiments of the invention.

Figure 2:
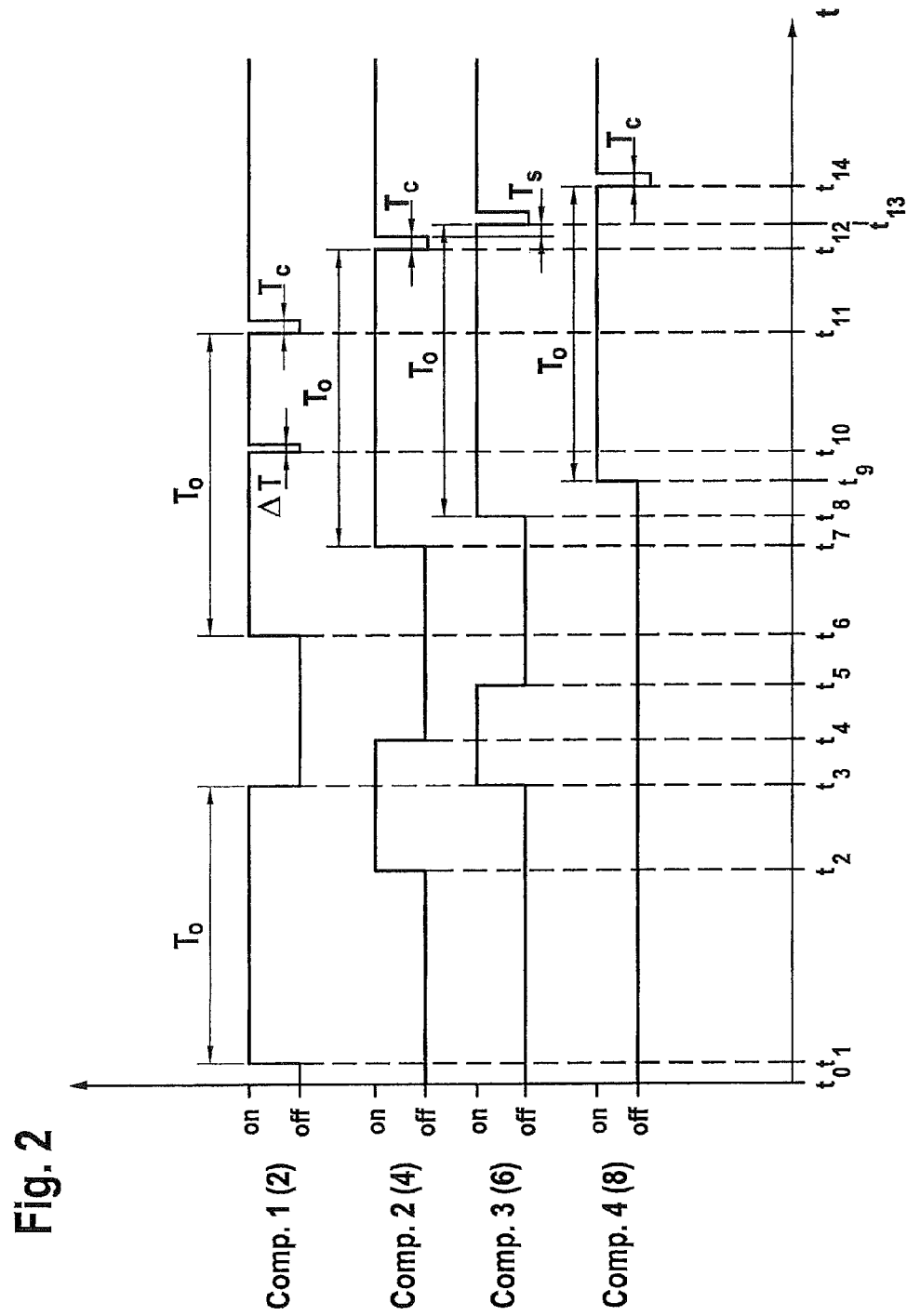
FIG. 2 shows an exemplary diagram depicting the operation of the set of piston compressors shown in FIG. 1 over time.

FIG. 2 shows an exemplary diagram depicting the operation of the set of piston compressors 2, 4, 6, 8 over time. The time t is plotted on the x-axis, while the respective modes of operation of the four compressors 2, 4, 6, 8 are plotted on the y-axis.

At time t0 all compressors 2, 4, 6, 8 stand still. At time t1 the first compressor 2 is started due to a need of compression/refrigeration. At time t2 the second compressor 4 is started as well since additional compression/refrigeration is needed. At time t3 the first compressor 2 is running for a predetermined maximum running time T0, thus it needs to be switched off for oil compensation. As not all compressors 2, 4, 6, 8 are running at this moment in time t3, a basic load switching operation is executed, i.e. the first compressor 2 is switched off and the third compressor 6, which has not been running before, is switched on taking over the workload/performance of the first compressor 2. The second and fourth compressors 4, 8 are not affected by this basic load switching operation and maintain their respective status of operation.

At time t4 the required output is reduced and the operation of the second compressor 4 is no longer needed, thus the second compressor 4 is switched off before it reaches the predetermined maximum running time T0. At time t5 the third compressor 6 is switched off as well and all compressors 2, 4, 6, 8 are stopped again.

The mode of operation during the interval from t0 to t5 is an example for oil compensation by basic load switching which is used when not all compressors 2, 4, 6, 8 are running.

At time t6 the first compressor 2 is started again to a need of compression/refrigeration. At times t7, t8 and t9 the second, third and fourth compressors 4, 6, 8 are started, respectively, to an stepwise raised need of compression/refrigeration so that at time t9 all four compressors 2, 4, 6, 8 are running. At time t10 the first compressor 2 is stopped for a short period of time ΔT. However, since said short period of time ΔT is shorter than the predetermined period of time for oil compensation TC the counting of the operation time of the first compressor 2 is not set back to zero but continues to count from the point in time t6, when the first compressor 2 has been started after it has not been standing still for a longer period of time than the predetermined time for oil compensation TC. Thus, the first compressor 2 reaches the predetermined maximum running time T0 at time t11 and it is switched off for oil compensation. After the predetermined time for oil compensation TC has expired the first compressor 2 is started again.

At times t12, t13 and t14 the second, third and fourth compressors 4, 6, 8 reach their predetermined maximum running time TO and are respectively switched off for a predetermined time for oil compensation TC. It is to be noted that the determination if a compressor 2, 4, 6, 8 reaches the predetermined maximum running time TO is done independently for each respective compressor 2, 4, 6, 8, and thus each of the compressors 2, 4, 6, 8 is switched off basically independently of the other compressors 2, 4, 6, 8. However, if a compressor 2, 4, 6, 8 reaches the predetermined maximum running time TO when another compressor 2, 4, 6, 8 has already been stopped for oil compensation or during a delay time TS after said other compressor 2, 4, 6, 7 has been started again, said compressor 2, 4, 6, 8 is not stopped immediately but only after the predetermined delay time TS after the other compressor 2, 4, 6, 8, which has been stopped before, has been started again. In other words, two compressors 2, 4, 6, 8 are not out of operation at the same time for oil compensation. This ensures that the set off piston compressors 2, 4, 6, 8 can provide sufficient output at any time.

The operation within the interval from t6 to t14 is an example for oil compensation according to an embodiment of the invention when all compressors 2, 4, 6, 8 are running.

Figure 3:
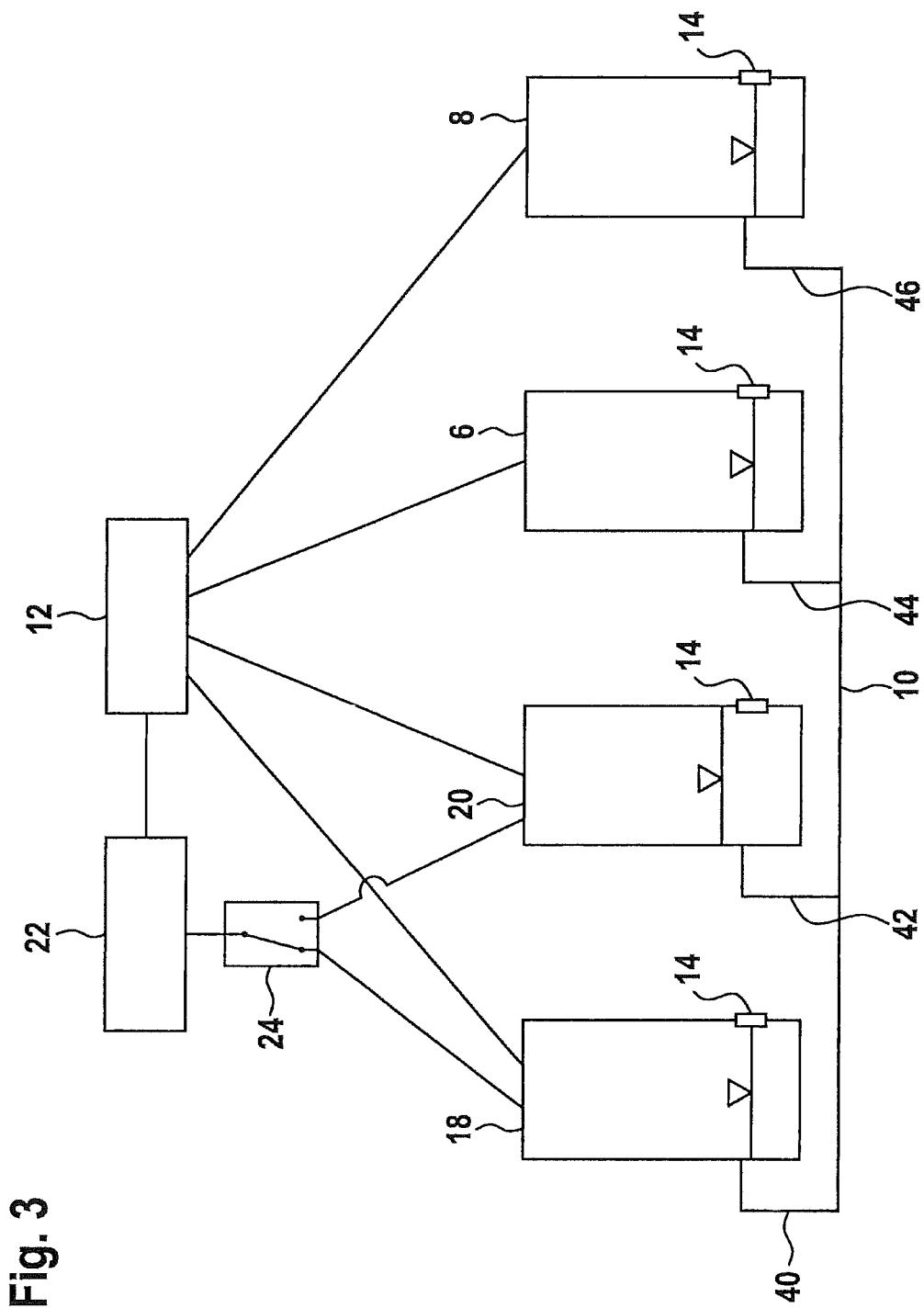
FIG. 3 shows a set of piston compressors according to a second embodiment of the invention.

FIG. 3 shows a set of four piston compressors 18, 20, 6, 8 according to a second embodiment of the invention. Like reference signs correspond to like features which will not be discussed in detail again. In the embodiment shown in FIG. 3 two of the compressors 18, 20, 6, 8, namely the compressors 18, 20 are designed as speed controllable compressors 18, 20 which are selectively connectable to a speed control 22 via switch 24. The speed control 22 and the switch 24 are controlled by the control unit 12. By controlling the speed of at least one of the speed controllable compressors 18, 20 the output of the set piston compressors 18, 20, 6, 8 can be adjusted finely to match exactly the desired output. I.e., the output is adjusted coarsely in a first step by controlling the number of the compressors 18, 20, 6, 8 running and finely in a second step by controlling the speed of at least one of the speed controllable compressors 18, 20.

Figure 4:
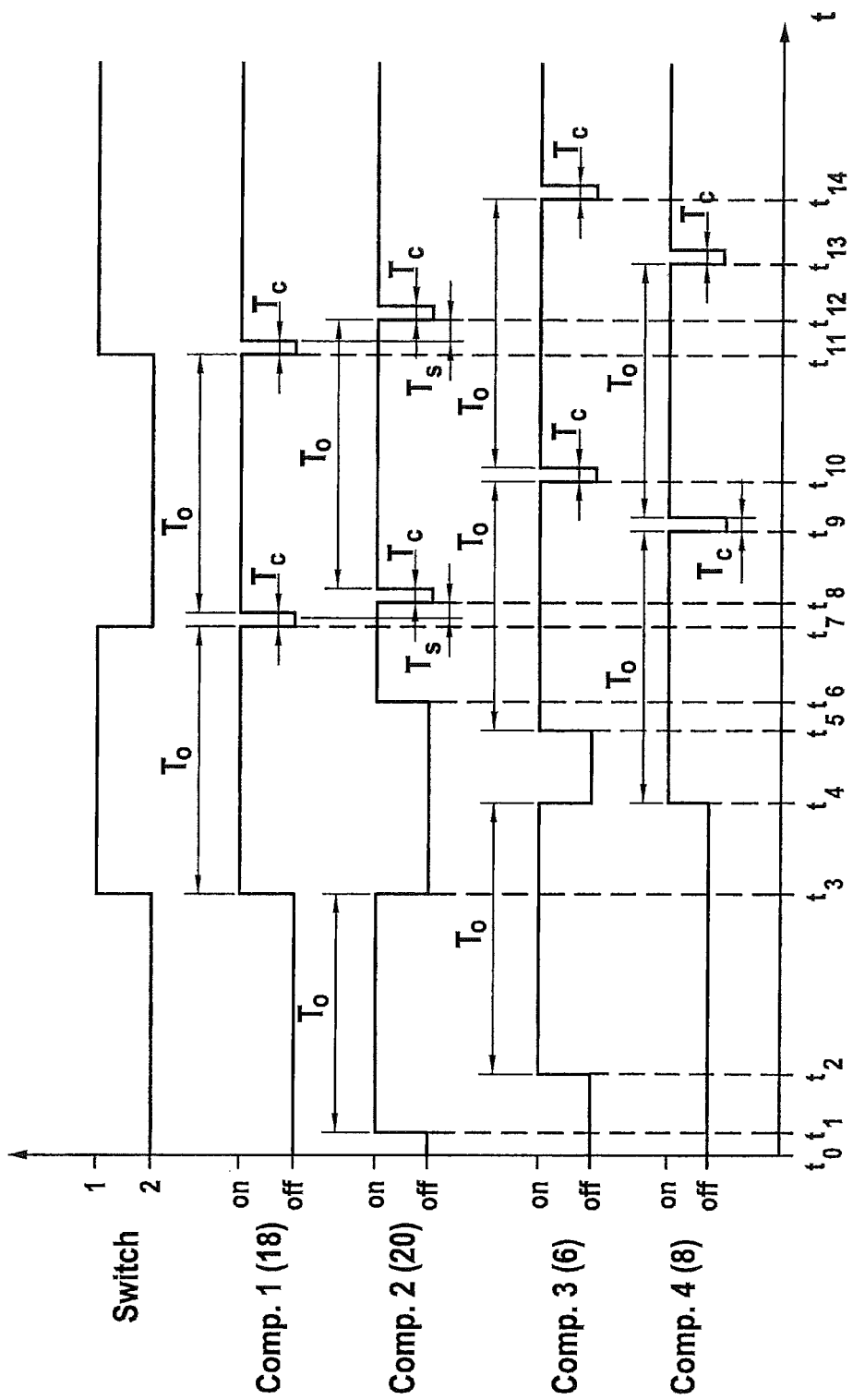
FIG. 4 shows an exemplary diagram depicting the operation of the set of piston compressors shown in FIG. 3 over time.

FIG. 4 shows an exemplary diagram of operation of the set of piston compressors 18, 20, 6, 8 over time. The time t is plotted against the x-axis, while the respective modes of operation of the four compressors 18, 20, 6, 8 and of the switch 24 are plotted against the y-axis.

At time t0 all compressors 18, 20, 6, 8 stand still and the switch 24 connects the second speed controllable compressor 20 to the speed control 22. At time t1 said second speed controllable compressor 20 is started. At time t2 the third compressor 6 running at constant speed is started, too. The speed of the speed controllable compressor 20 is always adjusted so that the set of piston compressors 18, 20, 6, 8 generates exactly the desired output.

At time t3 the second speed controllable compressor 20 reaches the predetermined maximum running time TO. Thus a basic load switching operation is executed as follows:

The speed of the second speed controllable compressor 20 is reduced to zero, some, preferably three, seconds later the second speed controllable compressor 20 is shut off. Some, preferably three, seconds later the switch 24 connects the first speed controllable compressor 18 to the speed control 22, and some, preferably three, seconds later, said first speed controllable compressor 18 is started and the speed of said first speed controllable compressor 18 is gradually increased, so that said first speed controllable compressor 18 takes over the workload and performance of the second speed controllable compressor 20 which has been stopped for oil compensation.

At time t4 the third compressor 6 running at constant speed reaches the predetermined maximum running time TO. Thus it is stopped and the fourth compressor 8 running at constant speed is started taking over the workload of the stopped third compressor 6, as already described with reference to FIG. 2.

At time t5 the third compressor 6 running at constant speed is switched on in addition to the fourth compressor 8 running at constant speed in order to increase the total output of the set of compressors 18, 20, 6, 8.

At time t6 the second speed controllable compressor 20 is also switched on in order to increase the output even further. It is to be noted that the speed control 22 remains connected to the first speed controllable compressor 18 at time t6 so that the second speed controllable compressor 20 is running with constant speed.

At time t7 the first speed controllable compressor 18 reaches the predetermined maximum running time TO. Thus a basic load switching operation is executed as follows:

First, the speed of the second speed controllable compressor 20 running at constant speed, is reduced, for example to 35 Hz and then said compressor 20 is shut off.

Then the speed of the first speed controllable compressor 18 is reduced to zero, some, preferably three, seconds later the second speed controllable compressor 18 is shut off. Some, preferably three, seconds later the switch 24 connects the second speed controllable compressor 10 to the speed control 22, and some, preferably three, seconds later, said second speed controllable compressor 20 is started and the speed of said second speed controllable compressor 20 is gradually increased until it reaches the original speed of the first speed controllable compressor 18 before the basic load switching operation has been started, so that said second speed controllable compressor 20 takes over the workload and performance of the first speed controllable compressor 18 which has been stopped for oil compensation.

After the predetermined time for oil compensation TC has expired, the first speed controllable compressor 18 is started again. A predetermined delay time TS after the first speed controllable compressor 18 has been started again, the second speed controllable compressor 20 is stopped for a predetermined time TC for oil compensation at time t8 although it has not reached the predetermined maximum running time TO, yet. However, in the mode of operation shown in FIG. 4, the second speed controllable compressor 20 is always stopped for oil compensations after a predetermined delay time TS after the first speed controllable compressor 18 has been stopped for oil compensation and has been started again.

At times t9 and t10 the fourth and third compressors 8, 6 running at constant speed respectively reach their predetermined maximum running time TO and are therefore respectively stopped for a predetermined time TC for oil compensation as already described with reference to FIG. 2.

At time t11 the first speed controllable compressor 18 reaches the predetermined maximum running time TO. Thus it is stopped for oil compensation and the switch 24 connects the first speed controllable compressor 18 to the speed control 22. The first speed controllable compressor 18 is started again after the predetermined time TC for oil compensation has expired.

After a predetermined delay time TS after the first speed controllable compressor 18 has been started again, the second speed controllable compressor 20 is stopped at time t12 for a predetermined time TC for oil compensation.

At times t13 and t14, the third and fourth compressors 8, 6 running at constant speed respectively reach the predetermined maximum running time TO and are respectively stopped for a predetermined time TC for oil compensation as already described with reference to the first embodiment.

Figure 5:
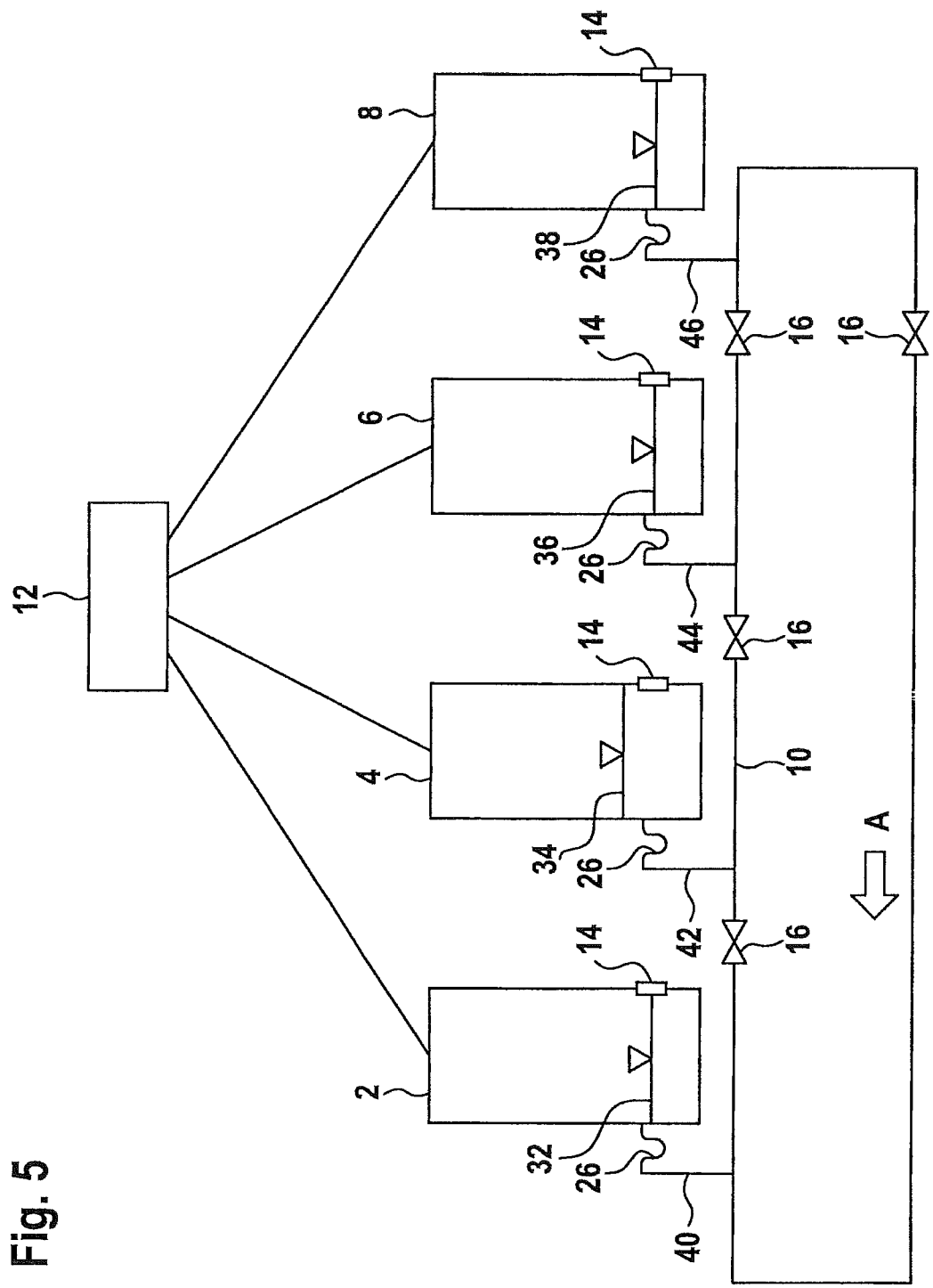
FIG. 5 shows a set of piston compressors according to a third embodiment of the invention.

FIG. 5 shows an alternative embodiment of the set of piston compressors 2, 4, 6, 8 shown in FIG. 1. Like features are designated by the same reference signs and will not be discussed in detail again.

In the embodiment shown in FIG. 5 the fluid connection 10 connecting the crank cases of the compressors 2, 4, 6, 8 is formed as a circular manifold. The fluid connection 10 is provided with four valves 16 fluidly separating the compressors 2, 4, 6, 8 from each other. The valves 16 are designed as one-way, non-return valves 16 restricting the flow within the fluid connection 10 to a predetermined direction A. In this embodiment the order of stopping the compressors 2, 4, 6, 8 for oil compensation corresponds to the direction of oil circulation A as it is defined by the one-way valves 16.

FIG. 6 shows an exemplary diagram of the operation of the set of piston compressors 2, 4, 6, 8 over time. Again, the time t is plotted against the x-axis, while the respective modes of operation for the four compressors 2, 4, 6, 8 are plotted against the y-axis.

At time t0 all compressors 2, 4, 6, 8 stand still. At time t1 the first compressor 2 is started. At times t2, t3 and t4 the second, third and fourth compressor 4, 6, 8 are respectively started as well so that all compressors are running at time t4.

At time t5 the first compressor 2 reaches the predetermined maximum running time TO and therefore it is stopped for oil compensation. After the predetermined time for oil compensation TC has expired the first compressor 2 is started again.

After a predetermined delay time TS after the first compressor 2 has been started again, the second 4 is stopped for a predetermined time for oil compensation TC at time t6 although it has not yet reached the predetermined maximum running time. However, in the mode of operation shown in FIG. 6, all compressors 2, 4, 6, 8 will be stopped sequentially when only one of the compressors 2, 4, 6, 8 has reached the predetermined maximum running time TO. Thus, the third compressor 6 is stopped at time t7, after a predetermined delay time TS after the second compressor 4 has been started again and the fourth compressor 8 is stopped at time t8 after a predetermined delay time TS after the third compressor 6 has been started again.

In the mode of operation shown in FIG. 6 the compressors 2, 4, 6, 8 are stopped sequentially in a predetermined sequence in order to allow for oil compensation through the circular manifold in the direction A defined by the one-way valves 16. It is to be noted that two of the compressors 2, 4, 6, 8 will not be stopped at the same time but that a further compressor 2, 4, 6, 8 will be stopped only after a predetermined delay time TS after the compressor 2, 4, 6, 8 which has been stopped before has been started again.

In an alternative embodiment the order of stopping the compressors 2, 4, 6, 8 is reversed every time the predetermined time of the operation of all compressors 2, 4, 6, 8 is reached. However in such an embodiment the fluid connection 10 may not be provided with one-way valves 16 as the direction of the oil flow will be reversed every time the predetermined time of the operation of all compressors 2, 4, 6, 8 is reached.

In a set of piston compressors according to the exemplary embodiments of the invention as described above each piston compressor is stopped for a predetermined period of time for oil compensation when its running time reaches a predetermined maximum running time. Not more than one piston compressor is stopped at the same time for oil compensation. Thus, an adequate lubrication of the compressors is ensured while at the same time a sufficient output is provided continuously over time.

In an embodiment of the invention the set of piston compressors comprises at least one piston compressor running at constant speed and at least one speed controllable piston compressor. A speed controllable piston compressor allows to finely adjust the total output of the set of piston compressors.

In an embodiment of the invention the set of piston compressors comprises at least two speed controllable piston compressors which are selectively connectable to a speed control for controlling the speed of the compressors. In this embodiment the control unit in operation sequentially interrupts the operation of each of the speed controllable piston compressors not connected to the speed control for a predetermined period of time for oil compensation after a predetermined delay time after the first speed controllable piston compressor, which has been stopped for oil compensation, has been started again. This embodiment allows to finely adjust the output of the set of compressors even when one of the speed controllable piston compressors is stopped for oil compensation and it ensures a sufficient lubrication of all the speed controllable piston compressors.

In an embodiment of the invention the speed controllable piston compressors are stopped sequentially one after the other, and each speed controllable piston compressor is stopped for oil compensation after a predetermined delay time after the speed controllable piston compressor which has been interrupted before has been started again. This ensures an appropriate oil compensation between the speed controllable piston compressors.

In an embodiment of the invention the control unit in operation starts over in counting the running time of a respective piston compressor, when said piston compressor is stopped for a period of time that is longer than the predetermined period of time for oil compensation. This avoids that a compressor is stopped without need for oil compensation.

In an embodiment of the invention the control unit in operation stops a first piston compressor, which reaches its maximum time of operation while a second piston compressor has been stopped for oil compensation, after a predetermined delay time after said second compressor has been started again. This avoids that two piston compressors are stopped at the same time for oil compensation which would result in a considerable and undesirable reduction of the output of the set of piston compressors.

In an embodiment of the invention each piston compressor is stopped for oil compensation after a predetermined delay time after the piston compressor which has been stopped before has been started again. This ensures that a sufficient output is provided at any time, even when one of the piston compressors is stopped for oil compensation.

In an embodiment of the invention the fluid connection is a circular manifold. A circular manifold provides an efficient means for oil compensation.

In an embodiment of the invention at least one one-way valve is arranged within the circular manifold, restricting the circulation in said manifold to one direction. In this embodiment the order of stopping the compressors corresponds to the direction of circulation defined by the at least one one-way valve. This improves the efficiency of oil circulation as it avoids that a portion of the lubricating oil oscillates between two adjacent compressors.

In an embodiment of the invention the order of stopping the compressors is reversed every time the predetermined time of the operation of all compressors is reached. This provides an efficient way of oil distribution among the compressors.

In an embodiment of the invention the period between starting a compressor and stopping the next compressor is larger than the predetermined period of time for oil compensation. This ensures a constant output of the set of compressors as it allows the first compressor to reach its nominal performance before the next compressor is switched off.

In an embodiment of the invention the fluid connection comprises at least one trap. Such a trap avoids that gas is flowing into the fluid connection producing bubbles which may hinder the oil compensation.

In an embodiment of the invention at least on of the compressors comprises an inspection glass and the fluid connection opens into the crank case of said compressor at substantially the same height at which the inspection glass is positioned. This allows to monitor the level of oil within the crank case of said compressor.

In an embodiment of the invention the set of piston compressors is configured such that, when all compressors are stopped, the height of the oil within the crank cases will adjust to a height within the visible range of the at least one inspection glass. This allows to easily check the level of oil within the crank case.

A set of piston compressors according to the embodiments of the invention as described above can be used for cooling refrigerating sales furnitures. Said refrigerating sales furnitures can be sales furnitures being refrigerated to temperatures of above 0° C. or freezing furnitures being refrigerated to temperatures of below 0° C.

The features, embodiments and advantages as described with respect to the set of piston compressors can also be realized in terms of method steps, with a method for fabricating the set of piston compressors according to the invention.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the dependent claims.

What is claimed is:

1. A set of piston compressors for use in a refrigeration system, comprising:
   a fluid connection between crank cases of the piston compressors for allowing oil compensation between said piston compressors; and
   a control unit which in operation monitors a running time of each piston compressor and, in case all piston compressors are running, subsequently interrupts the operation of a respective piston compressor for a predetermined period of time for oil compensation (TC) if its running time reaches a predetermined maximum running time (TO).

2. The set of piston compressors of claim 1,
   wherein at least one of the piston compressors is constant speed-piston compressor, and
   wherein at least one of the piston compressors is a speed controllable piston compressor.

3. The set of piston compressors of claim 2,
   further comprising at least two speed controllable piston compressors selectively connectable to a speed control for controlling the speed of said compressors,
   wherein the control unit in operation sequentially interrupts the operation of each of the speed controllable piston compressors (18, 20) not connected to the speed control for a predetermined period of time for oil compensation (TC) after a predetermined delay time (TS) after the speed controllable piston compressor which has been stopped before has been started again.

4. The set of piston compressors of claim 1, wherein the control unit in operation starts over in counting the running time of a respective piston compressor, when said piston compressor is stopped for a period of time that is longer than the predetermined period of time for oil compensation (TC).

5. The set of piston compressors of claim 1, wherein the control unit in operation stops a first piston compressor, which reaches the predetermined maximum running time (TO) while a second piston compressor has been stopped for oil compensation, after a predetermined delay time (TS) after said second compressor has been started again.

6. A set of piston compressors for use in a refrigeration system, comprising:
   a fluid connection between the crank cases of the piston compressors for allowing oil compensation between said piston compressors; and
   a control unit, which in case all piston compressors are running, monitors a common running time of the piston compressors, and, when the common running time reaches a predetermined maximum running time (TO),
   wherein the control unit sequentially interrupts the operation of each piston compressor for a predetermined period of time for oil compensation (TC) while the others continue to run.

7. The set of piston compressors of claim 6, wherein each piston compressor is stopped for oil compensation after a predetermined delay time (TS) after the compressor which has been stopped before has been started again.

8. The set of piston compressors of claim 6, wherein the fluid connection is a circular manifold.

9. The set of piston compressors of claim 8, wherein at least one one-way valve is arranged within the fluid connection, restricting the circulation in said fluid connection to one direction and wherein the order of stopping the compressors corresponds to the direction of circulation defined by the at least one one-way valve.

10. The set of piston compressors of claim 7, wherein the order of stopping the compressors is reversed every time the predetermined time of the operation (TO) of all compressors is reached.

11. The set of piston compressors of claim 6, wherein the period between re-starting a compressor and stopping the next compressor is larger than the predetermined period of time for oil compensation (TC).

12. The set of piston compressors of claim 6, wherein the fluid connection comprises at least one trap.

13. The set of piston compressors of claim 6, wherein at least one of the piston compressors comprises an inspection glass and the fluid connection opens into the crank case of the piston compressor at the height at which the inspection glass is positioned.

14. The set of piston compressors of claim 13, which is configured such that, when all compressors are stopped, the height of the oil within the crank cases will adjust to a height within the visible range of the at least one inspection glass.

15. A method for oil compensation in a set of piston compressors, comprising the steps of:
monitoring a running time of the piston compressors and, in case all piston compressors are running and the running time reaches a predetermined time of operation (TO),
interrupting the operation of a first piston compressor for a predetermined period of time for oil compensation (TC); and
sequentially interrupting the operation of each additional piston compressor for a predetermined period of time for oil compensation (TC).

16. The method for oil compensation of claim 15, wherein each piston compressor will be stopped for oil compensation after a predetermined delay time (TS) after the compressor which has been stopped before has been started again.

17. The method for oil compensation of claim 16, wherein the predetermined delay time (TS) between re-starting a first compressor and stopping a second compressor is longer than the predetermined period of time for oil compensation (TC).

* * * * *

UNITED STATES PATENT AND TRADEMARK OFFICE
CERTIFICATE OF CORRECTION

PATENT NO.        : 8,734,118 B2                                        Page 1 of 1
APPLICATION NO.   : 12/738235
DATED             : May 27, 2014
INVENTOR(S)       : Heinbokel et al.

It is certified that error appears in the above-identified patent and that said Letters Patent is hereby corrected as shown below:

On the title page, item [73] Assignee, delete "United Technologies Corporation, Hartford, CT (US)" and insert --Carrier Corporation, Farmington, CT (US)--.

Signed and Sealed this
Twenty-third Day of September, 2014

Michelle K. Lee
*Deputy Director of the United States Patent and Trademark Office*